US011115736B2

(12) United States Patent
Ruffini et al.

(10) Patent No.: US 11,115,736 B2
(45) Date of Patent: Sep. 7, 2021

(54) SYSTEM AND METHOD FOR DYNAMIC BANDWIDTH ASSIGNMENT (DBA) VIRTUALIZATION IN A MULTI-TENANT PASSIVE OPTICAL NETWORK

(71) Applicant: The Provost, Fellows, Foundation Scholars and the other members of Board, of the College of the Holy and Undivided Trinity of Queen Elizabeth, near Dublin, Dublin (IE)

(72) Inventors: Marco Ruffini, Dublin (IE); Amr Elrasad, County Kildare (IE); Nima Afraz, Dublin (IE)

(73) Assignee: THE PROVOST, FELLOWS, FOUNDATION SCHOLARS AND THE OTHER MEMBERS OF BOARD, OF THE COLLEGE OF THE HOLY AND UNDIVIDED TRINITY OF OUEEN ELIZABETH, NEAR DUBLIN, Dublin (IE)

(*) Notice: Subject to any disclaimer, the term of this patent is extended or adjusted under 35 U.S.C. 154(b) by 66 days.

(21) Appl. No.: 16/494,270
(22) PCT Filed: Mar. 16, 2018
(86) PCT No.: PCT/EP2018/056767
§ 371 (c)(1),
(2) Date: Sep. 13, 2019
(87) PCT Pub. No.: WO2018/167318
PCT Pub. Date: Sep. 20, 2018

(65) Prior Publication Data
US 2021/0120321 A1    Apr. 22, 2021

(30) Foreign Application Priority Data
Mar. 16, 2017    (GB) ...................... 1704185

(51) Int. Cl.
*H04Q 11/00*    (2006.01)
*H04L 12/927*    (2013.01)
(52) U.S. Cl.
CPC ....... *H04Q 11/0067* (2013.01); *H04L 47/808* (2013.01); *H04Q 2011/0084* (2013.01); *H04Q 2011/0086* (2013.01)
(58) Field of Classification Search
CPC combination set(s) only.
See application file for complete search history.

(56) References Cited

U.S. PATENT DOCUMENTS

| 2007/0041384 A1* | 2/2007 | Das ................... | H04Q 11/0067 370/395.4 |
| 2011/0142448 A1* | 6/2011 | Zou .................... | H04J 14/0201 398/58 |

(Continued)

OTHER PUBLICATIONS

M. Said Seddiki, "Automated Controllers for Bandwidth Allocation in Network Virtualization", 2013 IEEE 32nd International Performance Computing and Communications Conference (IPCCC)JEEE Xplore, Feb. 20, 2014, pp. 1-6.*

(Continued)

*Primary Examiner* — Omar S Ismail
(74) *Attorney, Agent, or Firm* — ARC IP Law, PC; Joseph J. Mayo

(57) ABSTRACT

The invention provides a method and system for Dynamic Bandwidth Assignment (DBA) Virtualization in a Passive Optical Network, comprising an Optical Line Termination (OLT) point and a plurality of Optical Network Units (ONU) and a plurality of Virtual Network Units (VNO), wherein each VNO is configured with a virtual Dynamic Bandwidth Assignment module to schedule a bandwidth assignment independently of the other VNOs and using a merging engine to implement a detailed bandwidth scheduling allocation over the Passive Optical Network.

9 Claims, 4 Drawing Sheets

(56) References Cited

U.S. PATENT DOCUMENTS

| | | | | |
|---|---|---|---|---|
| 2012/0321312 A1* | 12/2012 | Timm | ................ | H04Q 11/0067 398/66 |
| 2012/0321315 A1* | 12/2012 | Timm | ................ | H04Q 11/0067 398/67 |
| 2014/0056583 A1* | 2/2014 | Giddings | ............ | H04L 27/2697 398/44 |

OTHER PUBLICATIONS

Ahmed Amamou, "A Dynamic Bandwidth Allocator for Virtual Machines in a Cloud Environment," 2012 IEEE Consumer Communications and Networking Conference (CCNC), IEEE Xplore,Dec. 4, 2012, pp. 99-103.*

Chengjun Li,"Bandwidth Resource Sharing on the XGPON Transmission Convergence Layer in a Multi-operator Scenario",vol. 8, No. 11/Nov. 2016/J. Opt. Commun. Netw.,pp. 835-840.*

Michael P. McGarry,"Ethernet Passive Optical Network Architectures and Dynamic Bandwidth Allocation Algorithms",3rd Quarter 2008, vol. 10, No. 3,pp. 46-54.*

Xia Lv,"VCG-based Bandwidth Allocation Scheme for Network Virtualization," Jul. 26, 2012, 2012 IEEE Symposium on Computers and Communications (ISCC),pp. 1-4.*

Hamed Ahmadi,"Virtualization of Spatial Streams for Enhanced Spectrum Sharing," Jun. 2, 2017,2016 IEEE Global Communications Conference (GLOBECOM),pp. 1-5.*

International Search Report received in PCT/EP2018/056767, dated Jul. 16, 2018.

Elrasad, Amr, et al., "Virtual Dynamic Bandwidth Allocation Enabling True PON multi-Tenancy", 2017 Optical Fiber Communications Conference and Exhibition (OFC), OSA, Mar. 19, 2017, pp. 1-3.

Afraz Nima, et al, "Inter-operator Dynamic Capacity Sharing for Multi-Tenant Virtualized PON", 2017 IEEE 28$^{th}$ Annual International Symposium on Personal, Indoor, and Mobile Radio Communicatoins (PIMRC), IEEE, Oct. 8, 2017, pp. 106.

Li Chengjun, et al., "Bandwidth Resource Sharing on the XGPON Transmission Convergence Layer in a Multi-Operator Scenario", Journal of Optical Communications and Electronics Engineers, vol. 8, No. 11; Nov. 1, 2016, pp. 835-843.

* cited by examiner

SYSTEM AND METHOD FOR DYNAMIC BANDWIDTH ASSIGNMENT (DBA) VIRTUALIZATION IN A MULTI-TENANT PASSIVE OPTICAL NETWORK

FIELD

The invention relates a system and method for Dynamic Bandwidth Assignment (DBA) Virtualization in an Optical Network, for example a Passive Optical Network.

BACKGROUND

The worldwide installation of Fiber-to-the-premises (FTTP) access network solutions is hindered by the high upfront cost of deploying ubiquitous fiber infrastructure. While passive optical networks can provide lower cost compared to point-to-point solutions, their total cost of ownership is still high for most operators to justify a mass scale deployment. Sharing passive optical network (PON) infrastructure has thus been proposed as a solution for network operators to reduce the cost of running FTTP services. In addition, the ability for operators to offer business services (including for example mobile backhaul) in addition to residential services, is crucial to increase the overall PON network revenue. However running services with highly diverse requirements over a physical infrastructure shared among multiple operators (such as virtual network operators—VNOs) requires VNOs to have a tight control over PON capacity scheduling.

Passive optical networks (PON) are considered as one of the prominent access network solutions due to the high capacity and coverage they can provide. Meanwhile, the high Capital expenditure (CAPEX) required for PON deployment has been an obstacle to large-scale adoption, especially in rural areas with a lower number of users and bandwidth demand. To this point, multiple solutions have been proposed in the past to improve the business case of access fiber deployments, stemming from changes in the overall network architecture, M. Ruffini et al., DISCUS: End-to-end network design for ubiquitous high speed broadband services. ICTON 2013, to the development of cost effective transceivers for multi-wavelength PONs, N. Cheng, et al., Flexible TWDM PON system with pluggable optical transceiver modules. Optics Express, 22(2), 2014. A complementary approach to economic sustainability is to increase the revenue generated by the PON by increasing the number and types of services that can be supported, for example including mobile backhaul, P. Alvarez, et al., Evaluating dynamic bandwidth allocation of virtualized passive optical networks over mobile traffic traces. JOCN 8(3), 2016, and front haul, P. Chanclou et al., Optical fiber solution for mobile fronthaul to achieve cloud radio access network. Future Network Summit 2013, in addition to the enterprise and residential applications. A publication by Keita Nishimoto et al, entitled 'Virtualization of EPON OLT functions and collision suppression techniques for Multi-Point MAC Control' published at OFC 2016, Anaheim, Calif., USA discloses moving a single DBA from hardware to software and addresses a specific issue of time synchronization only.

Therefore, a scenario in which all the aforementioned services can coexist and operate on the same PON infrastructure is pivotal in increasing the utilization of the infrastructure, thus generating new revenue streams. A set of suitable multi-tenancy oriented solutions is then required to enable coexistence of multiple service providers offering services with diverse requirements. Multi-tenancy of access network has been developed through techniques like Next Generation Access (NGA) bitstream and Virtual Unbundled Local Access (VULA). However a problem with these approaches is that these high level virtualization tools do not give the ability to control capacity scheduling that can be necessary to satisfy strict Quality of Service requirements needed by 5G applications and future networks. A further problem is wasted bandwidth in a PON network as bandwidth allocation can be over-engineered so that Quality of Service is maintained. This is expensive waste of bandwidth resources.

It is therefore an object to provide an improved system and method for Dynamic Bandwidth Assignment (DBA) Virtualization in a Passive Optical Network.

SUMMARY

According to the invention there is provided, as set out in the appended claims, a system for Dynamic Bandwidth Assignment (DBA) Virtualization in a Passive Optical Network, comprising an Optical Line Termination (OLT) point and a plurality of Optical Network Units (ONU) and a plurality of Virtual Network Units (VNO), wherein each VNO is configured with a virtual Dynamic Bandwidth Assignment module to schedule a bandwidth assignment independently of the other VNOs and propose a detailed bandwidth scheduling allocation over the Passive Optical Network.

The present invention relates to a virtual DBA (vDBA), a virtualization technique that allows each VNO to deploy its own virtual DBA algorithm of choice on top of a shared PON infrastructure, controlled by an Infrastructure Provider (IP). This enables the possibility of having multiple virtual DBAs in a PON network in a multi-tenancy arrangement.

In one embodiment there is provided a merging engine adapted to communicate buffer report or report frames from the OLT to each virtual Dynamic Bandwidth assignment module of each VNO. It will be appreciated that the terms scheduled bandwidth assignment and bandwidth maps are the same. The first term is more functional as it defines what the system does, while the second is the term typically used in PON systems.

In one embodiment the merging engine is adapted to receive a virtual bandwidth map from each virtual Dynamic Bandwidth assignment module of each VNO.

In one embodiment the merging engine is configured to merge the received virtual bandwidth maps received from the VNO into a single coherent physical bandwidth map allocation scheduled to the plurality of Optical Network Units (ONU).

In one embodiment each vDBA produces one bandwidth map every frame. A VNO can have more vDBA, each producing one bandwidth map. In principle the VNO can produce more than one bandwidth map every frame. Considered together all vDBAs (and similarly all VNOs) will produce bandwidth maps, which are then merged by the merging engine into one bandwidth map (every frame).

It will be appreciated that if there is a single VNO there could be one or more bandwidth map depending on whether there is one vDBA or more than one. If there is only one VNO with one vDBA there will be one bandwidth map, in which case there is nothing to merge, and it becomes a trivial case of the current non virtualised PONs.

In one embodiment the virtual Dynamic Bandwidth Assignment is adapted to use an optimisation algorithm to determine how to merge the scheduling in a way that minimises the probability of not meeting a Service Level Agreement constraint.

In one embodiment the PON is a multi-wavelength operated system.

In one embodiment at least one VNO is adapted to assign bandwidth capacity independently by the number of wavelength used and generating a single Dynamic Bandwidth assignment and providing a single Bandwidth Map.

In one embodiment the merging engine is adapted to dynamically assign a single Optical Network Unit to different wavelengths in order to optimise ability to meet a desired QoS requirements.

In one embodiment there is provided an optimisation algorithm to provide optimal scheduling of virtual Dynamic Bandwidth Assignments across multiple wavelengths in a multi-wavelength system. This means that in a multi-wavelength system the merging engine can provide optimal scheduling of vBMAPs across multiple wavelengths to optimise both objectives of ability to meet VNO's QoS requirements (for example as primary) and maximising system throughput across all wavelength channels (for example as secondary objective). It works well in this virtualised system because the VNOs do not see (or do not care) what wavelength channels are being used, so it gives the merging engine a further degree of freedom in selecting the best solutions.

In another embodiment there is provided a method for Dynamic Bandwidth Assignment (DBA) Virtualization in a Passive Optical Network, comprising an Optical Line Termination (OLT) point and a plurality of Optical Network Units (ONU) and a plurality of Virtual Network Units (VNO), comprising the steps of configuring each VNO with a virtual Dynamic Bandwidth Assignment module and scheduling a bandwidth assignment independently of the other VNOs and proposing a detailed bandwidth scheduling allocation over the Passive Optical Network.

In one embodiment the system provides a method for Frame Level Sharing for DBA Virtualization in Multi-Tenant PONs.

The principle of virtualising the DBA (e.g., the upstream capacity scheduling mechanism) in PONs in a way that allows creation of multiple instances of it, each assigned to a different virtual network operator. Each VNO has the ability to run its own scheduling algorithm independently of the other VNOs and propose a detailed scheduling allocation over a shared PON.

The principle of the merging engine which has the task to facilitate communication between users and VNOs and of merging the individual virtual BMAPs from the VNOs into one coherent physical BMAP allocation to the users. Also the merging engine can use optimisation algorithms to determine how to merge the scheduling in a way that minimises the probability of not meeting the SLA constraints.

It will be appreciated that the virtualisation according to the present invention can be applied to multi-wavelength systems. Here a PON has more than one channel to serve a number of users (multi-wavelength PONs already exist). The VNO operates independently of the knowledge of the physical allocation of his customers to the different wavelengths. Even if each wavelength offers physically 10 Gb/s, a VNO is not bound to such physical constraint, and if the system has 8 wavelengths for a total capacity of 80 Gb/s, a VNO can be assigned say 16 Gb/s (which could be also dynamically changed). This will be spread across a number of services, some with tight quality of service requirements and other with looser or no QoS.

The VNO can assign capacity independently by the number of wavelength used, thus running one single DBA and providing a single BMap (while today if it owned the PON it would need to run a separate DBA on each wavelength).

The infrastructure provider, managing the merging engine, can dynamically assign users (and their services) to different wavelengths in order to optimise its ability to meet the strict QoS requirement of some of the service it provides to the VNO.

In one embodiment there is provided a system for Dynamic Bandwidth Assignment (DBA) Virtualization in a Passive Optical Network, comprising an Optical Line Termination (OLT) point and a plurality of Optical Network Units (ONU) and a plurality of Virtual Network Units (VNO), wherein each VNO is configured with one or more virtual Dynamic Bandwidth Assignment module to schedule a bandwidth assignment independently of the other VNOs and implement a detailed bandwidth scheduling allocation over the Passive Optical Network; said system comprising:

a merging engine adapted to communicate a buffer report or report frames from the OLT to each virtual Dynamic Bandwidth assignment module of each VNO, and adapted to receive a virtual bandwidth map from each virtual Dynamic Bandwidth assignment module of each VNO, wherein the merging engine is configured to merge the received virtual bandwidth maps received from the VNO into a single coherent physical bandwidth map allocation scheduled to the plurality of Optical Network Units (ONU) to implement said detailed bandwidth scheduling allocation.

In another embodiment there is provided a method for Dynamic Bandwidth Assignment (DBA) Virtualization in a Passive Optical Network, comprising an Optical Line Termination (OLT) point and a plurality of Optical Network Units (ONU) and a plurality of Virtual Network Units (VNO), comprising the steps of:

configuring each VNO with a virtual Dynamic Bandwidth Assignment module and scheduling a bandwidth assignment independently of the other VNOs;

implementing a detailed bandwidth scheduling allocation over the Passive Optical Network by configuring a merging engine to communicate a buffer report or report frames from the OLT to each virtual Dynamic Bandwidth assignment module of each VNO, and to receive a virtual bandwidth map from each virtual Dynamic Bandwidth assignment module of each VNO; and merging the received virtual bandwidth maps received from the VNO into a single coherent physical bandwidth map allocation scheduled to the plurality of Optical Network Units (ONU) to implement said detailed bandwidth scheduling allocation.

There is also provided a computer program comprising program instructions for causing a computer program to carry out the above method which may be embodied on a record medium, carrier signal or read-only memory.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

Figure 1:
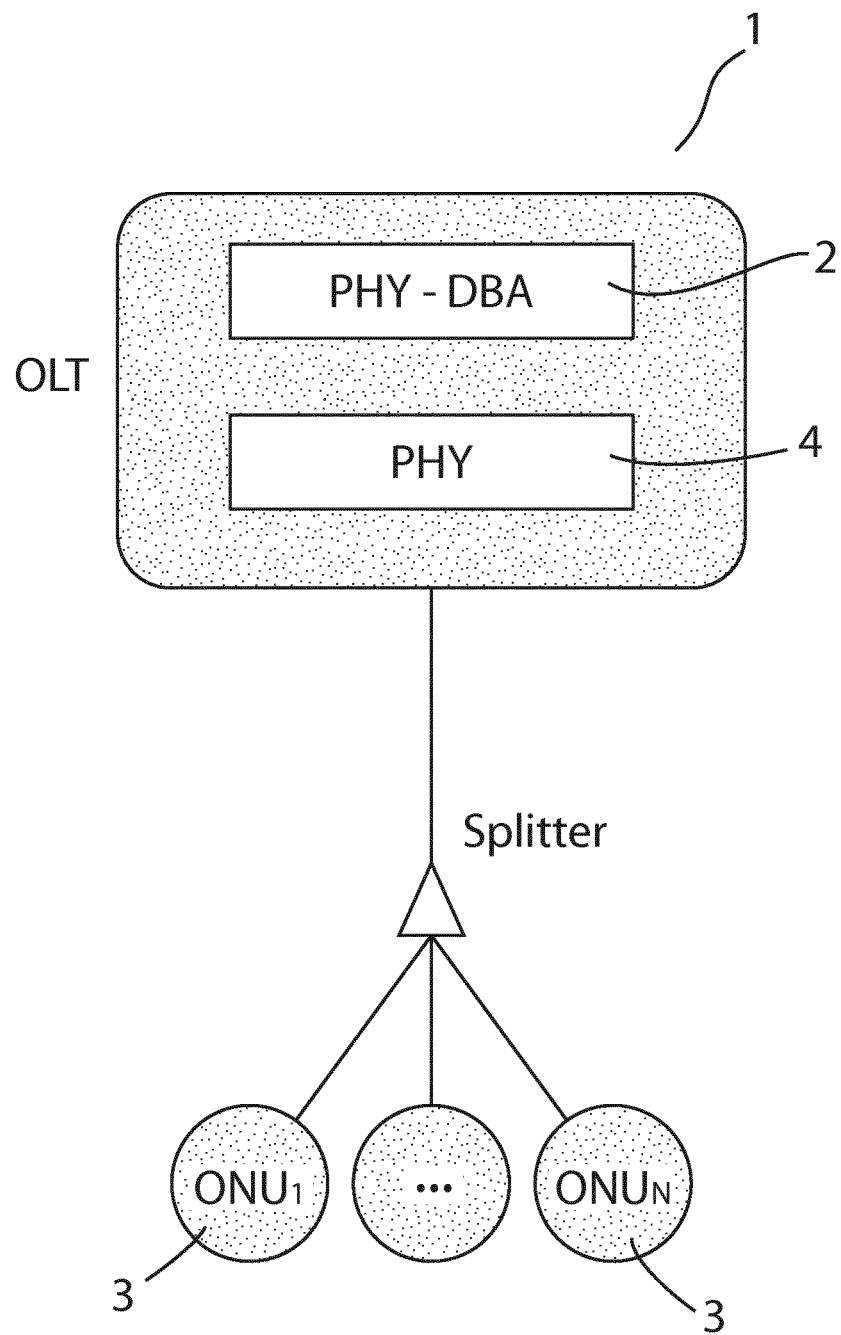
FIG. 1 illustrates traditional PON, a single DBA scheme is implemented on OLT hardware.
Figure 2:
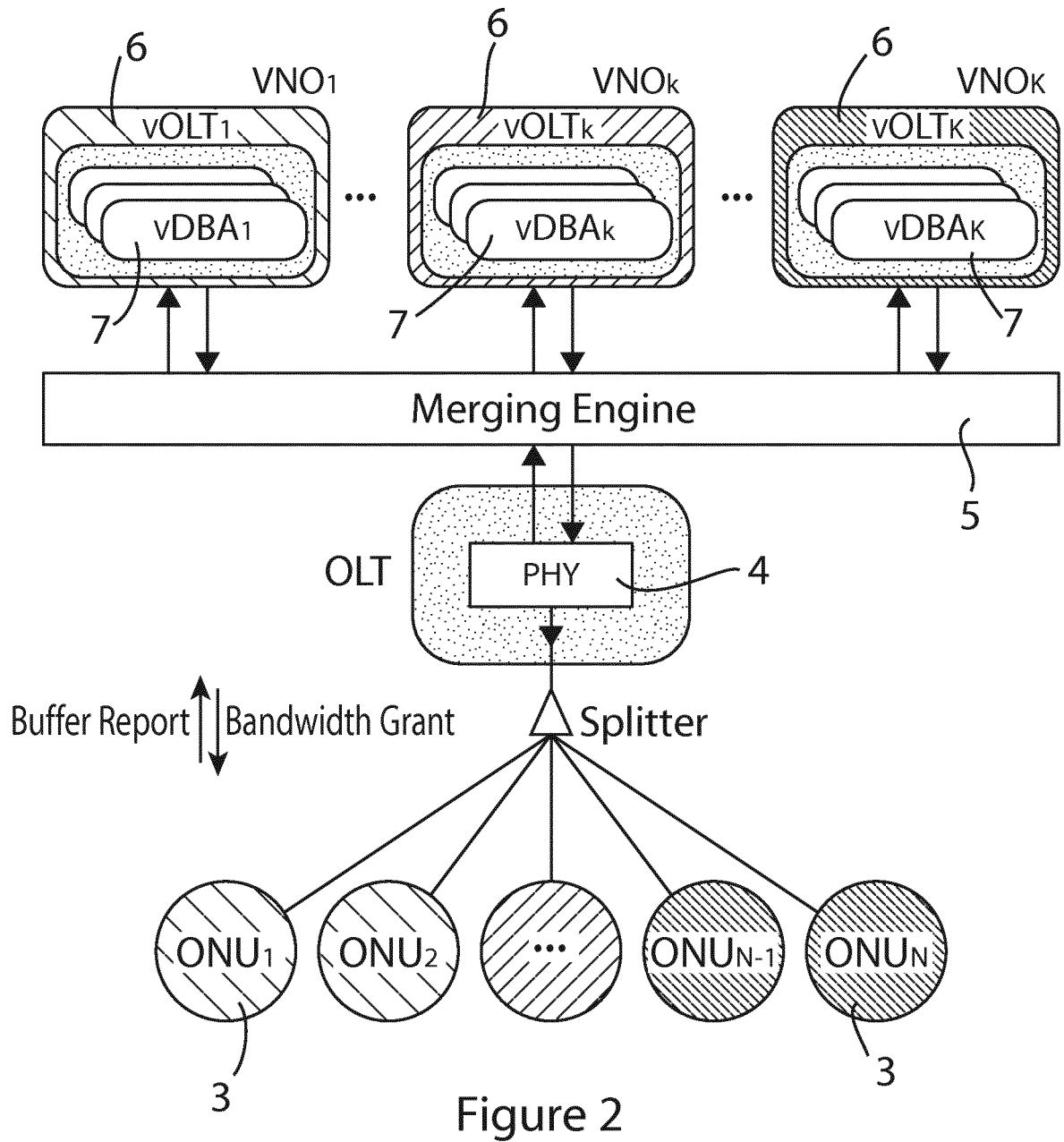
FIG. 2 illustrates multiple VNO's on a PON as a Multi-Tenant architecture comprising of three layers according to one embodiment of the invention.

Referring now to FIGS. 1 and 2 shows a comparison between the traditional PON and a virtualized MT-PON according to the present invention. FIG. 1 illustrates traditional PON indicated by the reference numeral 1, a single DBA scheme 2 is implemented on OLT hardware in a physical layer 4. Hereinafter referred to as PHY-DBA. The problem within the multi-tenancy architecture is that only the infrastructure provider controls the PHY-DBA function. Consequently, all of the VNOs will not be able to control the upstream DBA process of their own customers/services, and at best only work on an assured rate service, without the ability to schedule the burst allocation of their customers ONUs 3. This feature becomes important in order for the VNO to control additional parameters such as jitter, latency and availability.

In order to enable multiple VNO coexistence on PON, a Multi-Tenant architecture comprising of three layers is shown in FIG. 2.

A physical layer 4 remains the same as in traditional PONs. The main difference is that it directs the DBRu (for example the ITU XGS-PON protocol) from the ONU T-CONTs to a merging engine 5, which directly forwards them to one or more virtual DBA (vDBA) engines 6 that are in charge of assigning capacity to them. While the invention is compliant with ITU standards, it will be appreciated the same mechanism can be applied to (10GE-PON) report frames. The PHY layer 4 can be controlled by the Infrastructure Provider.

Virtual DBA (vDBA) Layer

A Virtual DBA, vDBA, layer 7 is controlled by one or more VNO's 6, which has full control over the choice of the most appropriate virtual DBA algorithm to run on its virtual PON slice. The vDBA 7 calculates a virtual bandwidth map (vBMap) for its PON slice and delivers it to the merging engine 5.

Multiple versions of the vDBA can be considered, depending on whether the vDBA 6 operates a feedback loop with the merging engine 5 and on the level of precisions it intends to assign capacity, which is related to the type of application transported.

Merging Engine Layer

The merging engine 5 comprises a merging engine layer which has two main tasks. First, it is responsible for communications with the vDBAs controlled by the VNOs. The merging engine layer passes upstream buffer reports (DBRus or report frames) to vDBA and it receives the corresponding virtual bandwidth grants (virtual bandwidth maps or virtual gate messages). Second, the merging layer analyzes the virtual bandwidth grants from all vDBAs, merging them into one physical bandwidth grant (bandwidth maps or gate frames). Within the context of a PON, the merging engine layer is responsible for merging virtual bandwidth maps generated from virtual DBAs, generating a physical BMap (PHY-BMap). This is the bandwidth map that can be sent over the PON physical interface.

It should be noticed that for some specific services that are latency and jitter constrained, such as mobile front haul, DBRUs can also be generated by applications that interface directly with a vDBA. In the case of front haul for example DBRus for specific T-CONTs could be generated by an interface between the BBU scheduling process and the vDBA, rather than by the ONU.

This section describes in detail, considering a number of suggested options, the mechanisms for sharing capacity in a PON.

The merging engine 5 can be adapted to implement a scheme and architecture for overall capacity sharing, where the concept of wavelength channels is completely abstracted to the virtual operators, which can thus operate a virtual PON at any desired capacity, by using a subset of the capacity of one wavelength or merging capacity from multiple wavelengths together. Thus even if the overall PON might operate over 8 wavelengths of 10 Gb/s capacity each, virtual operators could dynamically operate over an aggregate capacity of say 6 Gb/s, or 18 Gb/s or any other value within the overall capacity limit.

The VNO can define a committed information rate (CIR), which will be always guaranteed by the PON (or guaranteed within a percentage of time) and a peak information rate (PIR) higher than the CIR, that is allowed if there is spare capacity. Traffic rates above the PIR are automatically rejected (or could be delayed if the admission control system operates a traffic shaper rather than a traffic policer). This allows the physical operator to decide how much traffic can be assigned to the operators as CIR (in principle the sum of CIRs assigned to multiple VNOS should not be larger than the overall system capacity, but some overbooking could be done according to the availability considered in the contract between VNOs and Infrastructure Provider (IP)).

The system and method allows virtual operators to identify the class of service of the applications transported. Since the invention allows multiplexing of operators and services (some with very tight performance requirements), it is important that the VNO defines the requirement class of each transported service.

In principle there can be three main categories of service/traffic classification that are defined. One is where there are quality of service (QoS) requirements but those are only considered in terms of CIR and PIR (i.e., typically of today's systems). The T-CONTs associated to such services are referred to QoS-T-CONTs. A second class of traffic is where additional constraints other than CIR/PIR capacity need to be satisfied in order for the system to work properly. In this case additional parameters such as jitter, latency and availability are specified for what we call strict-QOS T-CONTs. A third class of traffic is only for best effort.

Additional subcategories can be created for each of these classes, for example different sub-classes can define different latency, jitter, packet loss and capacity requirements, as well as their availability. Availability is defined as the percentage of time that the QoS (intended as an arbitrary but pre-established mix of capacity, jitter, latency and availability requirements) will be met on a specific T-CONT.

Figure 3:
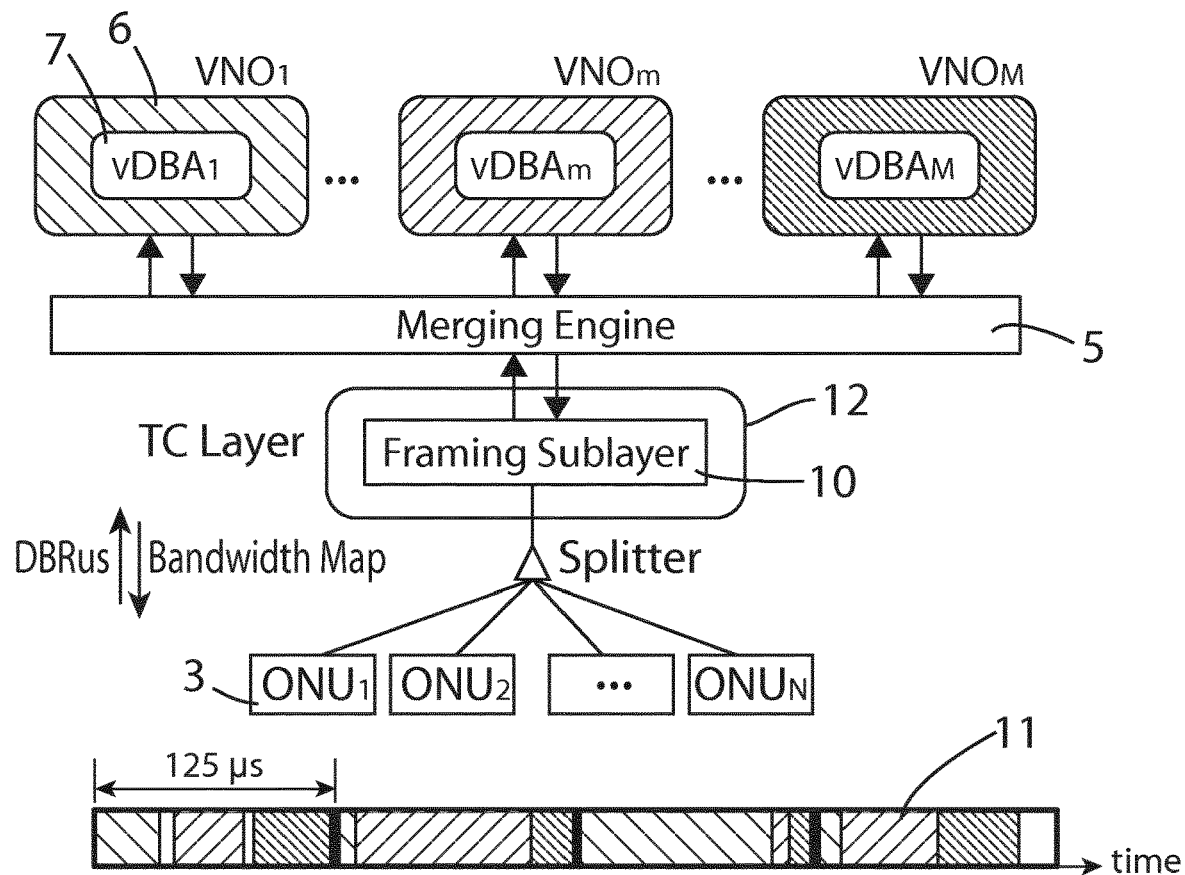
FIG. 3 illustrates a Frame Level Sharing (FLS) architecture according to tone embodiment of the invention.

In one embodiment a Frame Level Sharing (FLS) architecture 10 is provided, shown in FIG. 3, to facilitate the coexistence of multiple VNOs in the PON. The FLS architecture 10 falls under the category of medium access control layer sharing and includes a new layer, the merging engine, to be placed on top of a PON transmission convergence (TC) layer 12. It should be noticed that for this embodiment a XGS-PON standard is used, although the work can be applied to other types of ITU-T PON standards. In the FLS architecture 10, the bandwidth requests (DBRus) from the Optical Network Units (ONUs) 3 are relayed by the TC layer 12 to the vDBA instance of the corresponding VNO. Such virtual instance can physically run, for example, on a server in the central office, also owned by the PON infrastructure provider.

With this information each VNO 6 can calculate a virtual Bandwidth Map (vBWMap), achieving full control over the capacity scheduling to the ONUs it serves. The merging engine layer shown FIG. 3 has two main tasks. First, it is responsible for handling the communications to each vDBA instance. It passes the upstream buffer reports (DBRus) to the vDBA and it receives the corresponding virtual bandwidth maps from each VNO. Second. It performs a full analysis on all the received vBWMaps, merging them into one physical bandwidth map 11. This analysis includes both grant sizing approach and grant scheduling algorithm within the next upstream frame. This operation is critical to solve the contention between conflicting vBWMap allocations, and within the context of XGS-PON.

A number of different algorithms for the vDBA and merging engines can be implemented. For example an independent vDBA without jitter, latency and availability assurance: QoS T-CONTs can be employed.

This is the simplest form of the algorithm, where the vDBA 7 and Merging Engine (ME) 5 do not agree to any specific class definition and there is no admission control carried out by the ME on specific T-CONTs, reuses most of the current DBA mechanisms, for maximum backward compatibility. Here the merging engine simply passes the DBRu requests from the ONUs to the appropriate vDBA engines. Each vDBA engine operates a schedule of the upstream resources and creates a bandwidth map (BMap) as defined in the PON standards. All BMaps are then forwarded to the merging engine, which merges them together. In this simplest version the vDBA might not be synchronised to the ME, meaning that while the ME generates a BMap for each frame, some of the vDBA might miss the current allocation if the virtual BMap they generate arrives to the ME after a given time and will instead be allocated for the next frame. A synchronous version can also be considered where instead all vDBAs are aware (being synchronised to the ME) of the timing they need to send their vBMap.

In this version, where the ME is not aware of traffic class definition, the ME only checks whether traffic is consistent with CIR and PIR policies and then merges the vBMap from the multiple VNOs into one physical BMap. This simpler ME algorithm will merge the vBMap minimising the change in allocations.

A more advanced ME algorithm can also minimize the allocation of non-adjacent ONU transmissions within the same frame. This is useful where the same ONU is served by more than one VNO, and can reduce the transmission overhead associated with multiple upstream burst from the same ONU. The additional capacity can then be exploited by the IP to increase the overall CIR and PIR budget.

While these techniques allow multiplexing traffic from multiple VNOs, they do not give any guarantee that the scheduling of capacity within the vBMap will remain the same as the original. Thus even if the vDBA has carefully allocated the vBMap to control latency and jitter, the ME is not able to assure that such allocation will remain in the PHY-BMap.

If these additional QoS mechanisms are not expected to be met, a very simple implementation of the ME can be carried out, where T-CONT allocation is assigned by concatenating the vBMaps of each VNO, after having compacted the allocation within each vBMap (i.e. remove any gap between T-CONT assignment, except for the mandatory guard interval between burst transmissions).

In general it should be noticed that vDBAs have no constraints to give vBMap every frame. Each vDBA can assign each service interval (SI) independently as long as the ME assigns to each VNOs its own share of every upstream frame. A more sophisticated algorithm can be done to shift one of the vDBA if the ME notices that frequent and repetitive idle upstream frames are scheduled.

Another embodiment can employ a coordinated vDBA allocation with jitter, latency and availability assurance: strict-QoS TCONT-s. With this method, in addition to respecting the CIR and PIR agreed, the IP tries to guarantee additional performance parameters such jitter, latency and availability.

For this case it is essential that traffic is appropriately tagged to the specific class of service (e.g., to define jitter, latency and availability that can be supported). Such classes can be then associated to T-CONTs according to the PON standards In another embodiment a strictly-enforced vBMap calculation can be employed. In this case the vDBA calculates a vBMap autonomously, associating the traffic slot allocation to specific T-CONTs. When the ME tries to put together the multiple vBMaps from the different vDBAs into the PHY-BMap, it will first allocate the non-overlapping parts of the BMap, and where overlapping occurs give priority to the T-CONTs with stricter jitter/latency/availability requirements, shifting the lower priority T-CONTs. Typically best effort T-CONTs can be moved anywhere along the PHY-BMap or allocated on different frames. QoS T-CONTs can also be moved over a number of frames. However strict-QoS T-CONTs can only be moved as far as this does not violate the jitter/latency/availability requirements of the class they belong to. It should be noticed that this might not always be possible and thus the IP should operate admission control for T-CONTs with assured QoS.

If a new T-CONT cannot be assigned as proposed by the vDBA (i.e., in the specific position in the vBMap), the ME can provide feedback to the vDBA proposing a different allocation. If the vDBA can accept it (i.e., it is still compliant to its QoS requirement) the ME will allocate the capacity.

It should be noticed that this mechanism can work best for services with static capacity requirement (such as front haul types of applications), as the admission control can be applied when the service starts and kept there for a number of frames before being updated. In case of highly variable traffic, the admission control system will have to guarantee strict QoS up to a maximum capacity. If more capacity is request a new admission control with a higher capacity threshold will need to be agreed.

It will be appreciated that when this admission control can be operated for every single frame, then the system becomes fully dynamic.

Jitter Versus Latency Trade-Off

In the cases where the ME cannot fit a strict-QOS T-CONT in the PHY-BMap, as mentioned above, the engine can propose to the vDBA to accept a different allocation. It could be argued that while doing so would allow the ME to guarantee the established value of jitter, it might move the problem towards the VNO which will see an increase the jitter of the service. Ultimately it is the end-to-end jitter that matters to the application. However it should be noted that the jitter is a differential quantity, thus if the strict-QoS T-CONT is permanently shifted to a different place, it's jitter will settle to low values (as far as the additional latency caused can be tolerated).

Loosely-Enforced vBMap Calculation

In this case the vDBA does not specify exactly where the T-CONTs need to be allocated in the vBMap, but uses the vBMap to convey information about the T-CONTs class of service.

The ME has in this case more freedom in choosing where in the PHY-BMap to place the T-CONTs allocations.

Jitter Minimisation Algorithms

Since jitter is a differential value, it needs to be calculated over at least two consecutive T-CONTs allocations. In practice this is often calculated over a number of allocations and measured as a variance. The following algorithms describe a number of implementations for the ME for controlling jitter in the PHY-BMap allocation.

Jitter Minimisation Contention Resolution

This algorithm works through a moving window that covers a number of frames, to calculate the average latency and from that the jitter as the variance of the delay on each strict-QoS T-CONT transmission.

For each new frame, the ME merges the vBMaps requests into one that minimises the calculated jitter for that frame. Since it is envisaged that the time might be too short for calculating optimal solutions, a heuristic should be considered for the implementation of the ME algorithm.

A variance of this algorithm is also proposed that rather than just minimising the jitter across all strict-QoS T-CONTs in the frame also tries to provide fairness among different strict-QoS T-CONTs. It will thus also try to minimise the individual jitter of each strict-QoS T-CONT, bringing more fairness into the system. It is envisaged that a heuristic algorithm will be employed also in this case, whose complexity will probably be larger than the WJM algorithm.

Jitter Minimisation Contention Avoidance

In this algorithm the merging engine defines starting point(s) for each strict-QoS T-CONT within each/multiple upstream frames according to the required Jitter constraints (max and average) for each service.

Finally it should pointed out that any of the above algorithms can work on strictly-enforced or loosely enforced algorithms described above.

Sharing Policy

In this policy, each running vDBA is aware of its allocated share of the upstream capacity, Ci. Thus, the cumulative grant size of the produced virtual bandwidth cannot under any circumstances exceed the corresponding VNO share of the upstream frame. This policy helps reducing the merging engine task complexity. The merging engine shall keep the size of the received bandwidth grants as they are. It will only perform simple a scheduling algorithm to ensure that the complete bandwidth map has no overlapped grants.

Figure 4:
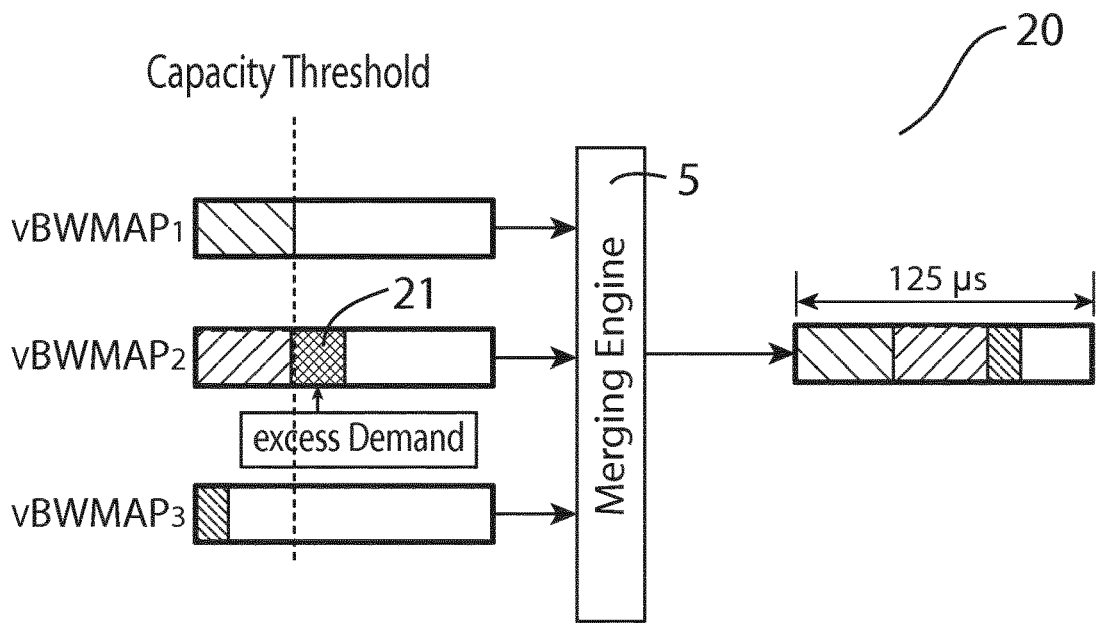
FIGS. 4 & 5 illustrate two sharing policies that can be implemented by the merging engine according to different implementations.

An illustration of this policy is shown in FIG. 4, indicated by the reference numeral 20, where the second VNO cannot allocate its excess demand bandwidth 21 although there is enough bandwidth capacity because the third VNO is under loaded. This simple policy does not allow unused capacity of under loaded VNOs to be shared with the other overloaded VNOs. However, this ensures full isolation among VNOs. Unlike SS static mechanism, each VNO can be polled on each upstream frame to help meeting low latency requirements.

Figure 5:
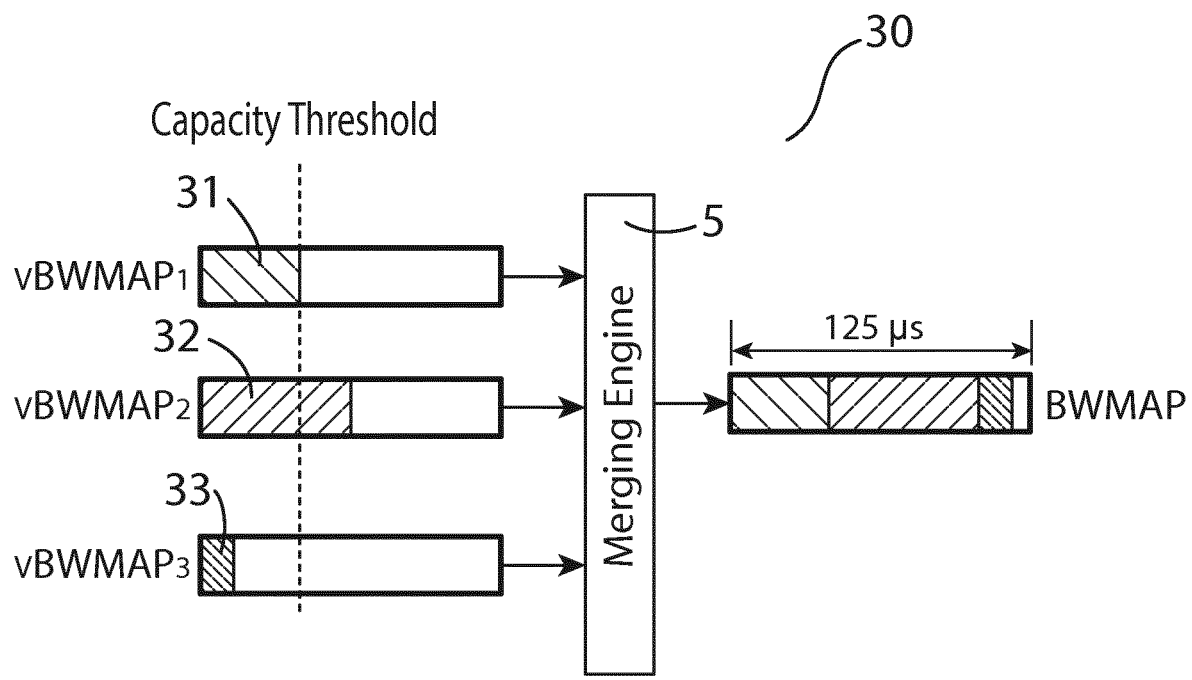

The capacity sharing policy, shown in FIG. 5 and indicated by the reference numeral 30, compromises between bandwidth utilization efficiency and VNOs isolation. The policy works as follows. Each vDBA acts as if it owns the whole PON capacity and produces the corresponding virtual bandwidth maps. Consequently, these vBWMaps 32, 32 and 33 can have cumulative grant size as large as the whole upstream frame. The merging engine layer 5 task is more sophisticated in order to process the virtual bandwidth maps from all VNOs and produce the final bandwidth map. Regarding grant sizing, the merging engine acts as follows:

1) If the cumulative size of all bandwidth grants can be accommodated within the upstream frame, none of the virtual bandwidth map grant sizes is reduced.
2) If the cumulative size of all bandwidth grants is too big to be accommodated in one upstream frame, the bandwidth grants of overloaded VNOs are to be reduced in order to be fitted in the next upstream frame.

Generally speaking, the bandwidth grants reduction process cuts the non-guaranteed bandwidth grants starting from the most delay tolerant T-CONT and going higher if necessary, the merging engine layer starts reducing best effort traffic grants first. If it is still not enough, non-assured traffic bandwidth grants are also to be reduced. Although the analysis described is based on a single-wavelength system, the concept can be easily extended to multi-wavelength systems, where for example to total PON capacity across multiple wavelengths can be virtualized into slices with fine granularity of capacity (for example virtual slices do not need to operate as 10G PONs, but could be dynamically assigned for example as 4G PONs or 18G PONs, as required). In addition, the invention can also be easily adapted to applications requiring very low latency, like front haul. For example the BBU could embed the DBA and generate the bandwidth map without waiting for DBRu messages, thus enabling tight synchronization between BBU and OLT.

Relation to SDN Provisioning System

It should be noticed that the values of capacity, latency, jitter and availability considered in the vDBA system are only relative to the PON system.

Indeed services running over a PON have QoS requirements that need to be satisfied end-to-end, thus across a number of network, and the PON might only be one of these networks. A SDN system can be used to calculate the overall QoS requirement parameters, and calculate the relative values of capacity, jitter, latency and availability that should apply to the PON section.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a memory stick or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

What is claimed is:

1. A system for Dynamic Bandwidth Assignment (DBA) Virtualization in a Passive Optical Network, comprising an Optical Line Termination (OLT) point and a plurality of Optical Network Units (ONU) and a plurality of Virtual Network Units (VNO), wherein each VNO is configured with one or more virtual Dynamic Bandwidth Assignment module to schedule a bandwidth assignment independently of other VNOs of said plurality of VNOs and implement a detailed bandwidth scheduling allocation over the Passive Optical Network; said system comprising:

a merging engine adapted to communicate a buffer report or report frames from the OLT point to each virtual Dynamic Bandwidth assignment module of each VNO, and adapted to receive a virtual bandwidth map from each virtual Dynamic Bandwidth assignment module of each VNO, wherein the merging engine is configured to merge the virtual bandwidth maps received from the VNO into a single coherent physical bandwidth map allocation scheduled to the plurality of Optical Network Units (ONU) to implement said detailed bandwidth scheduling allocation;

wherein the Passive Optical Network (PON) is a multi-wavelength operated system; and wherein at least one VNO is adapted to assign bandwidth capacity independently by a number of wavelength used and generating a single Dynamic Bandwidth assignment and providing a single Bandwidth Map.

2. The system of claim 1 wherein the virtual Dynamic Bandwidth Assignment is adapted to use an optimization algorithm to determine how to merge the detailed bandwidth scheduling allocation in a way that minimizes a probability of not meeting a Service Level Agreement constraint.

3. The system of claim 1 wherein an optimization algorithm provides optimal scheduling of virtual Dynamic Bandwidth Assignments across multiple wavelengths in a multi-wavelength system.

4. The system of claim 1 wherein the merging engine is adapted to dynamically assign a single Optical Network Unit to different wavelengths in order to optimize ability to meet a desired QoS requirements.

5. A method for Dynamic Bandwidth Assignment (DBA) Virtualization in a Passive Optical Network, comprising an Optical Line Termination (OLT) point and a plurality of Optical Network Units (ONU) and a plurality of Virtual Network Units (VNO), said method comprising:

configuring each VNO with a virtual Dynamic Bandwidth Assignment module and scheduling a bandwidth assignment independently of other VNOs of said plurality of VNOs;

implementing a detailed bandwidth scheduling allocation over the Passive Optical Network by configuring a merging engine to communicate a buffer report or report frames from the OLT point to each virtual Dynamic Bandwidth assignment module of each VNO, and to receive a virtual bandwidth map from each virtual Dynamic Bandwidth assignment module of each VNO; and merging the virtual bandwidth maps received from the VNO into a single coherent physical bandwidth map allocation scheduled to the plurality of Optical Network Units (ONU) to implement said detailed bandwidth scheduling allocation; and at least one VNO adapted to assign bandwidth capacity independently by a number of wavelengths used and generating a single Dynamic Bandwidth assignment and providing a single Bandwidth Map.

6. The method of claim 5 further comprising using an optimization algorithm to determine how to merge the detailed bandwidth scheduling allocation in a way that minimizes a probability of not meeting a Service Level Agreement constraint.

7. The method of claim 5 further comprising using an optimization algorithm to provide optimal scheduling of virtual Dynamic Bandwidth Assignments across multiple wavelengths in a multi-wavelength system.

8. The method of claim 5 further comprising adapting the merging engine to dynamically assign a single Optical Network Unit to different wavelengths in order to optimize ability to meet a desired QoS requirements.

9. A computer program or software comprising program instructions for causing a computer to perform a method for Dynamic Bandwidth Assignment (DBA) Virtualization in a Passive Optical Network, comprising an Optical Line Termination (OLT) point and a plurality of Optical Network Units (ONU) and a plurality of Virtual Network Units (VNO), the method comprising:

configuring each VNO with a virtual Dynamic Bandwidth Assignment module and scheduling a bandwidth assignment independently of other VNOs of said plurality of VNOs;

implementing a detailed bandwidth scheduling allocation over the Passive Optical Network by configuring a merging engine to communicate a buffer report or report frames from the OLT point to each virtual Dynamic Bandwidth assignment module of each VNO, and to receive a virtual bandwidth map from each virtual Dynamic Bandwidth assignment module of each VNO; and merging the virtual bandwidth maps received from the VNO into a single coherent physical bandwidth map allocation scheduled to the plurality of Optical Network Units (ONU) to implement said detailed bandwidth scheduling allocation; and at least one VNO adapted to assign bandwidth capacity independently by a number of wavelengths used and generating a single Dynamic Bandwidth assignment and providing a single Bandwidth Map.

* * * * *